(12) United States Patent
Kaji et al.

(10) Patent No.: US 10,345,545 B2
(45) Date of Patent: Jul. 9, 2019

(54) METHOD OF MANUFACTURING AN OPTICAL FIBER CABLE

(71) Applicant: FUJIKURA LTD., Koto-Ku, Tokyo (JP)

(72) Inventors: Tomoaki Kaji, Sakura (JP); Masatoshi Ohno, Sakura (JP); Daiki Takeda, Tokyo (JP); Ken Osato, Sakura (JP); Masayoshi Yamanaka, Sakura (JP); Naoki Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/823,798

(22) Filed: Nov. 28, 2017

(65) Prior Publication Data

US 2018/0081134 A1 Mar. 22, 2018

Related U.S. Application Data

(62) Division of application No. 14/951,750, filed on Nov. 25, 2015, now Pat. No. 9,869,838.

(51) Int. Cl.
*G02B 6/44* (2006.01)

(52) U.S. Cl.
CPC ......... *G02B 6/4433* (2013.01); *G02B 6/4404* (2013.01); *G02B 6/4413* (2013.01); *G02B 6/4495* (2013.01); *G02B 6/4405* (2013.01)

(58) Field of Classification Search
None
See application file for complete search history.

(56) References Cited

U.S. PATENT DOCUMENTS

| | | |
|---|---|---|
| 2002/0034367 A1 | 3/2002 | Gaillard et al. |
| 2002/0146222 A1 | 10/2002 | Pouilly et al. |
| 2006/0147164 A1 | 7/2006 | Bau et al. |
| 2008/0304798 A1 | 12/2008 | Pavan et al. |
| 2011/0110635 A1* | 5/2011 | Toge ............. G02B 6/4403 385/102 |

(Continued)

FOREIGN PATENT DOCUMENTS

| | | |
|---|---|---|
| EP | 2 557 444 A1 | 2/2013 |
| JP | 2006-178230 A | 7/2006 |

(Continued)

OTHER PUBLICATIONS

Restriction/Election Requirement issued in parent U.S. Appl. No. 14/951,750 dated Nov. 18, 2016.

(Continued)

*Primary Examiner* — Jerry Rahll
(74) *Attorney, Agent, or Firm* — Sughrue Mion, PLLC

(57) ABSTRACT

An optical fiber cable is provided. The cable includes: an optical fiber core having a central axis; a presser winding covering the optical fiber core; a sheath covering the presser winding; two tension members in the sheath and facing each other with the central axis therebetween; and two rip cords facing each other with the central axis therebetween and being in direct contact with the sheath and the presser winding. The optical fiber core includes a plurality of optical fiber tapes arranged around the central axis and having mutually different stripe ring marks applied thereon. Each optical fiber tapes includes a plurality of optical fibers intermittently adhered to each other.

6 Claims, 6 Drawing Sheets

(56) References Cited

U.S. PATENT DOCUMENTS

| | | |
|---|---|---|
| 2011/0188820 A1 | 8/2011 | Merbach et al. |
| 2011/0211793 A1 | 9/2011 | Barrett et al. |
| 2012/0093468 A1 | 4/2012 | Keller et al. |
| 2012/0257864 A1 | 10/2012 | Consonni et al. |
| 2014/0112630 A1 | 4/2014 | Hennink et al. |
| 2015/0153529 A1 | 6/2015 | Jost et al. |
| 2015/0268427 A1 | 9/2015 | Register, III |
| 2016/0041354 A1 | 2/2016 | Guenter et al. |
| 2016/0103287 A1 | 4/2016 | Jost et al. |
| 2016/0223769 A1 | 8/2016 | Ito et al. |
| 2016/0266342 A1 | 9/2016 | Ellis et al. |
| 2017/0052337 A1 | 2/2017 | Hudson, II et al. |
| 2017/0082813 A1 | 3/2017 | Cignarale et al. |
| 2017/0115451 A1 | 4/2017 | Sajima et al. |

FOREIGN PATENT DOCUMENTS

| | | |
|---|---|---|
| JP | 2011-221083 A | 4/2011 |
| JP | 2013-054219 A | 3/2013 |
| JP | 2013-195534 A | 9/2013 |
| WO | 2015/052951 A1 | 4/2015 |

OTHER PUBLICATIONS

Non-Final Office Action issued in parent U.S. Appl. No. 14/951,750 dated May 18, 2017.

Notice of Allowance issued in parent U.S. Appl. No. 14/951,750 dated Sep. 13, 2017.

\* cited by examiner

METHOD OF MANUFACTURING AN OPTICAL FIBER CABLE

This is a divisional application based upon U.S. patent application Ser. No. 14/951,750 filed Nov. 25, 2015, the contents of all of which are incorporated herein by reference in their entirety.

BACKGROUND OF THE INVENTION

Technical Field

The present invention generally relates to an optical fiber cable and a method of manufacturing an optical fiber cable.

Description of Related Art

A loose tube cable includes multiple tubes containing an optical fiber, and each tube is filled with a jelly. A slot cable includes a core (slotted core) including multiple slots for housing an optical fiber.

A non-slotted cable does not have any tubes or slotted cores and thus the outer diameter and the weight of the non-slotted cable can be further reduced compared with the loose tube cable and the slotted cable. Further, in the non-slotted cable, removal of an optical fiber is easier than in the loose tube cable which includes a jelly.

However, in the non-slotted cable including single-core optical fibers, identification of the optical fibers may be difficult. On the other hand, in the non-slotted cable including optical fiber tapes obtained by collectively coating multiple optical fibers, distortion of the optical fibers may be significant due to bending of the optical fiber tape.

Relating to the above, Japanese Unexamined Patent Application, First Publication No. 2011-221083 describes putting of the same mark on optical fibers included in an optical fiber tape. PCT International Publication No. WO2015/052951 describes a technique for bunching optical fiber tape core wires with a bundling material. Japanese Unexamined Patent Application, First Publication No. 2013-195534 describes an optical fiber cable in which individual optical fiber tapes are twisted.

SUMMARY (1) An optical fiber cable according to an aspect of the present invention including: an optical fiber core having a central axis; a presser winding covering the optical fiber core; a sheath covering the presser winding; two tension members in the sheath and facing each other with the central axis therebetween; and two rip cords facing each other with the central axis therebetween and being in direct contact with the sheath and the presser winding, wherein the optical fiber core includes a plurality of optical fiber tapes arranged around the central axis and having mutually different stripe ring marks applied thereon, and each optical fiber tapes includes a plurality of optical fibers intermittently adhered to each other.

(2) It may be arranged such that the presser winding and the sheath are in direct contact with each other.

(3) It may be arranged such that the optical fiber core includes a plurality of optical fiber units arranged around the central axis, each unit includes the optical fiber tapes and the bunching members bunching the optical fiber tapes, and the bunching members are capable of being differentiated from each other.

(4) It may be arranged such that each bunching member includes a bunching string arranged in a direction of the central axis so as to be wound around the optical fiber tapes.

(5) It may be arranged such that each bunching member includes a first bunching string and a second bunching string, the first bunching string and the second bunching string arranged in a direction of the central axis so as to be wound around the optical fiber tapes, and the winding direction of the first bunching string and the winding direction of the second bunching string are opposite to each other.

(6) It may be arranged such that each bunching member includes a first bunching string and a second bunching string, the first bunching string and the second bunching string arranged in a direction of the central axis so as to be wound around the optical fiber tapes, and the winding direction of the first bunching string and the winding direction of the second bunching string are reversed at a point at which the first bunching string and the second bunching string come into contact with each other.

(7) It may be arranged such that the optical fiber units are mutually twisted in an SZ manner.

(8) It may be arranged such that the optical fiber core includes a plurality of inner units arranged around the central axis and a plurality of outer units arranged around the inner units, each inner unit and each outer unit includes the optical fiber tapes and the bunching members for bunching the optical fiber tapes, and the bunching members are capable of being differentiated from each other.

(9) It may be arranged such that each bunching member includes a bunching string arranged in a direction of the central axis so as to be wound around the optical fiber tapes.

(10) It may be arranged such that each bunching member includes a first bunching string and a second bunching string, the first bunching string and the second bunching string arranged in a direction of the central axis so as to be wound around the optical fiber tapes, and the winding direction of the first bunching string and the winding direction of the second bunching string are opposite to each other.

(11) It may be arranged such that each bunching member includes a first bunching string and a second bunching string, the first bunching string and the second bunching string arranged in a direction of the central axis so as to be wound around the optical fiber tapes, and the winding direction of the first bunching string and the winding direction of the second bunching string are reversed at a point at which the first bunching string and the second bunching string come into contact with each other.

(12) It may be arranged such that the inner units are mutually twisted in an SZ manner, and the outer units are mutually twisted in an SZ manner.

(13) A method of manufacturing an optical fiber cable according to an aspect of the present invention includes: feeding a plurality of optical fiber tapes including a plurality of optical fibers intermittently adhered to each other; forming an optical fiber core by gathering the optical fiber tapes; covering an outer circumference of the optical fiber core with a presser winding; and covering an outer circumference of the presser winding with a sheath, the feeding of the optical fiber tapes, the forming of the optical fiber core, the covering of the outer circumference of the optical fiber core with the presser winding, and the covering of the outer circumference of the presser winding with the sheath are performed in a tandem manner.

(14) It may be arranged such that the forming of the optical fiber core further includes: forming a plurality of optical fiber units by dividing the optical fiber tapes into multiple groups and bunching each group using a bunching member; and mutually twisting the optical fiber units in an SZ manner.

(15) It may be arranged such that the forming of the optical fiber core further includes: forming a plurality of optical fiber units by dividing the optical fiber tapes into multiple groups and bunching each group using a bunching member; forming an inner core by mutually twisting some of the optical fiber units in an SZ manner; and forming an outer core by mutually twisting the remaining of the optical fiber units in an SZ manner so as to cover an outer circumference of the inner core.

DETAILED DESCRIPTION OF EMBODIMENTS

Figure 1A:
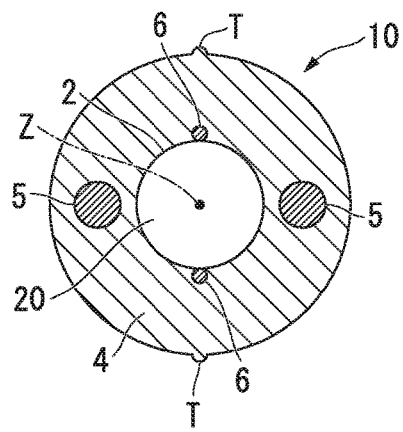
FIG. 1A is a cross sectional view showing an example of an optical fiber cable according to an exemplary embodiment of the present invention.
Figure 1B:
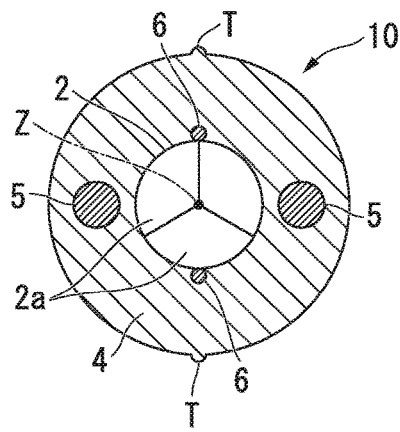
FIG. 1B is a cross sectional view showing another example of the optical fiber cable according to an exemplary embodiment of the present invention.
Figure 1C:
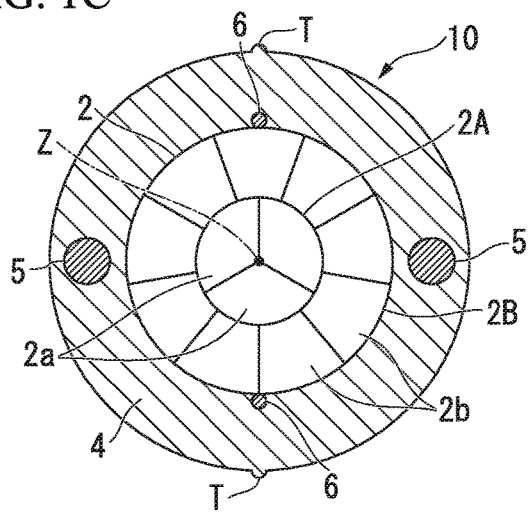
FIG. 1C is a cross sectional view showing still another example of the optical fiber cable according to an exemplary embodiment of the present invention.
Figure 1D:
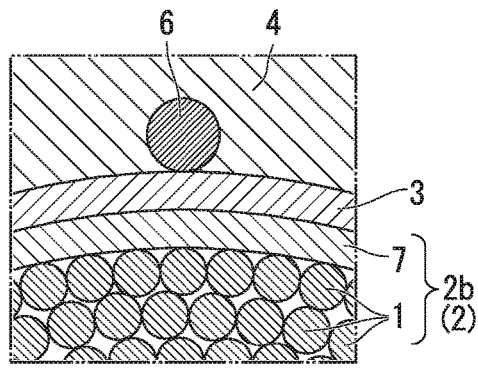
FIG. 1D is an enlarged view showing part of an optical fiber cable.
Figure 1E:
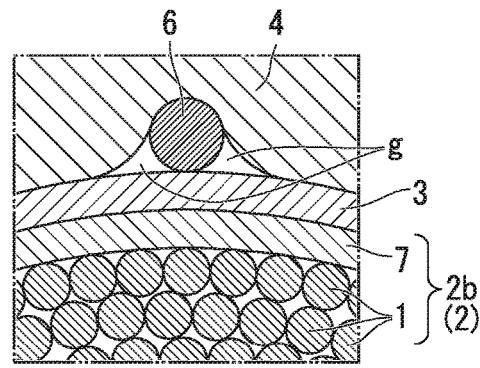
FIG. 1E is an enlarged view showing part of an optical fiber cable.

Hereinafter, exemplary embodiments of the present invention will be described with reference to the drawings.
<Optical fiber cable>
FIGS. 1A to 1C are cross sectional views showing an example of the cross section perpendicular to the longitudinal direction of an optical fiber cable according to an exemplary embodiment of the present invention. FIGS. 1D and 1E are an enlarged view showing part of the optical fiber cable.

An optical fiber cable 10 includes: an optical fiber core 2 having a central axis Z; a presser winding 3 covering the optical fiber core 2; a sheath 4 covering the presser winding 3; two tension members 5 which are present in the sheath 4 and face each other with the central axis Z therebetween; and two rip cords 6 which face each other with the central axis Z therebetween and are in direct contact with the sheath 4 and the presser winding 3.

The optical fiber core 2 includes a plurality of optical fiber tapes 20 which are arranged around the central axis Z. The optical fiber core 2 exemplarily shown in FIG. 1A includes three pieces of the optical fiber tape 20 arranged around the central axis Z.

The optical fiber core 2 may include a plurality of optical fiber units 2a which are arranged around the central axis Z and each include a plurality of the optical fiber tapes 20. The optical fiber core 2 exemplarily shown in FIG. 1B includes three optical fiber units 2a arranged around the central axis Z (single-layer structure).

The optical fiber core 2 may include a plurality of optical fiber units 2a (inner units) arranged around the central axis Z and a plurality of optical fiber units 2b (outer units) arranged around the inner units 2a. The optical fiber core 2 exemplarily shown in FIG. 1C includes three inner units 2a arranged around the central axis Z and nine outer units 2b arranged around the three inner units 2a (multilayer structure). In the optical fiber cable 10 exemplarily shown in FIG. 1C, the three inner units 2a configure an inner core 2A, while the nine outer units 2b configure an outer core 2B.

The optical fiber core 2 including a plurality of optical fiber units 2a (2b) may be either the single-layer structure or the multilayer structure depending on the number of the optical fiber units. The number of the optical fiber units 2a (2b) may be determined depending on the intended use of the optical fiber cable.

It should be noted that the cross section of the optical fiber core 2 may be circular as shown in FIGS. 1A to 1C or elliptical.

In the optical fiber cable 10 exemplarily shown in FIG. 1A, the optical fiber core 2 includes a plurality of the optical fiber tapes 20 on which mutually different marks 22 are applied. In the optical fiber cables 10 exemplarily shown in FIGS. 1B and 1C, the optical fiber units 2a (2b) include a plurality of the optical fiber tapes 20 on which mutually different marks 22 are applied.

Figure 2:
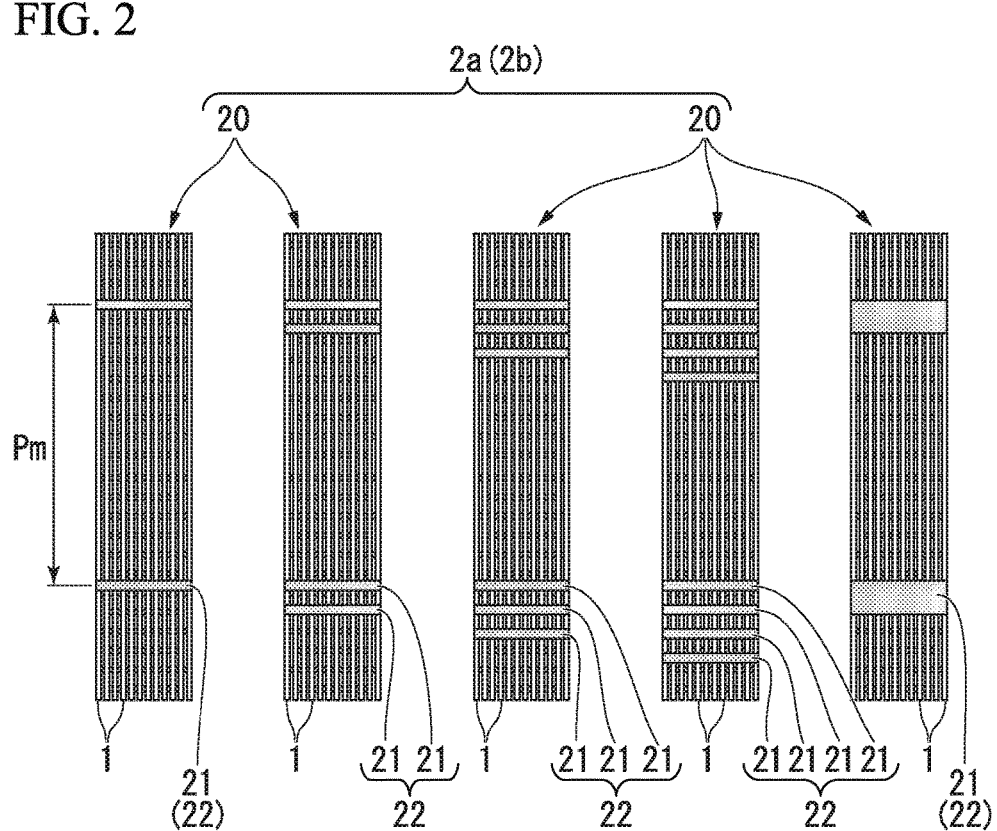
FIG. 2 is a schematic view showing an example of a plurality of optical fiber tapes on which mutually different marks are applied.

FIG. 2 exemplarily shows five pieces of the optical fiber tape 20 on which mutually different marks 22 (stripe ring marks) are applied. Each piece of the optical fiber tape 20 includes a plurality of optical fibers 1 as described in detail below.

The five pieces of the optical fiber tape 20 shown in FIG. 2 can be differentiated from each other by the number or thickness of the ring marks 21, the ring marks 21 configuring the stripe ring marks 22. Therefore, the optical fiber tapes 20 included in the optical fiber core 2 can be differentiated from each other. In the optical fiber cable 10 in which the optical fiber core 2 includes the optical fiber units 2a (2b), the optical fiber tapes 20 included in each optical fiber unit can be differentiated from each other. Thus, it is possible to specify a target piece of the optical fiber tape 20 among the optical fiber tapes 20.

In the example shown in FIG. 2, a plurality of stripe ring marks 22 are applied at a pitch Pm in the longitudinal direction of the optical fiber tape 20. The pitch Pm may be appropriately determined so that an operator can see the pitch when removing the optical fiber 1 from the optical fiber cable 10. The pitch Pm may be determined so as to have a specific relationship with the pitch of a bunching member 7 described below.

It should be noted that the marks 22 are not limited to stripe ring marks as shown in FIG. 2, and appropriate marks may be employed. The number of the marks 22 may be determined depending on the number of the pieces of the optical fiber tape 20 included in the optical fiber core 2 or each optical fiber unit 2a or 2b.

Figure 3:
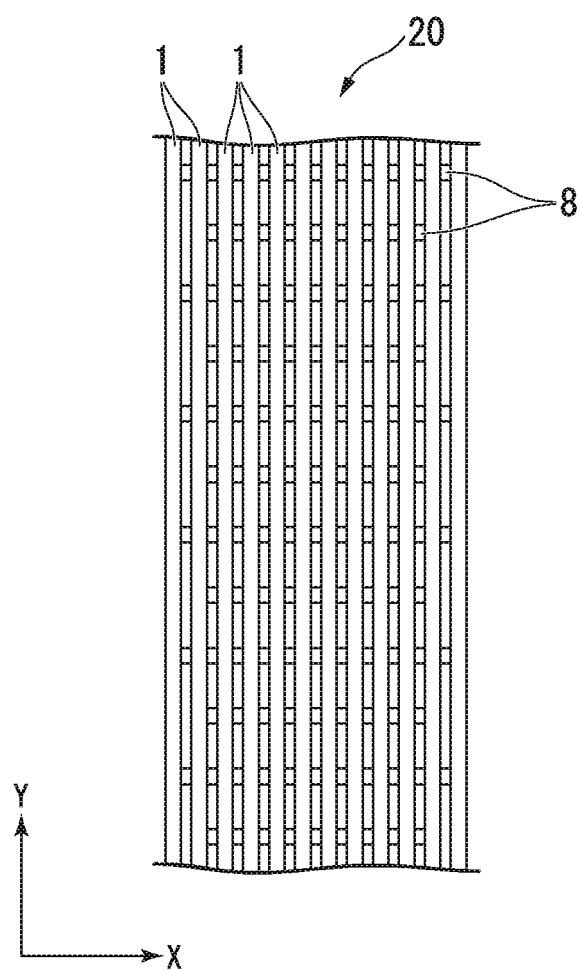
FIG. 3 is a schematic view showing an example of a plurality of the optical fibers which are intermittently adhered to each other.

Each piece of the optical fiber tape 20 includes a plurality of optical fibers 1 which are intermittently adhered to each other. FIG. 3 shows an example of a piece of the optical fiber tape 20 including twelve optical fibers 1 which are intermittently adhered to each other with connection members 8.

Between two optical fibers 1 adjacent to each other, a plurality of connection members 8 are arranged in the longitudinal direction (Y direction in FIG. 3) of the optical fiber 1 at certain intervals (intermittently). In the width direction (X direction in FIG. 3) of the optical fiber tape 20 as well, a plurality of connection members 8 are intermittently arranged. In addition, there is a gap between two optical fibers 1 adjacent to each other. The optical fiber tape 20 can be bent in a direction perpendicular to the longitudinal direction of the optical fiber tape at the connection members 8. In other words, the optical fiber tape 20 can be irreversibly and flexibly transformed at the connection members 8 and thus is capable of having a planar form as shown in FIG. 3 or a steric form.

Therefore, when a bending stress is applied to the optical fiber cable 10, it is possible to prevent the stress from being applied to the optical fibers 1 in a biased manner. This allows the optical fiber cable 10 to have a certain degree of bending resistance without using any tubes or slotted cores.

The number of the optical fibers 1 in a single piece of the optical fiber tape 20 may be determined depending on the intended use etc. of the optical fiber cable 10. For example, a piece of the optical fiber tape 20 including four, eight, twelve, or sixteen (multiples of four) optical fibers 1 may be employed. In this case, fusion splicing between the optical fiber cable and an existing optical cable including multiples of four optical fibers can be easily performed. Particularly, with the number of the optical fibers 1 being twelve or less, collective fusion splicing becomes possible using an existing fusion splicer because existing fusion splicers are intended to be used for an optical cable including twelve or less optical fibers.

The optical fiber 1 may be an optical fiber, or an optical fiber tape core wire having a coating layer on the outer circumference of an optical fiber.

The optical fibers 1 in a single piece of the optical fiber tape 20 may have different colors from each other. In this case, it is possible to specify a target optical fiber among the optical fibers 1 included in the single piece of the optical fiber tape 20.

The optical fiber 1 can be colored by, for example, an additional colored layer. When using an optical fiber tape core wire, the coating layer thereof may be colored.

The presser winding 3 may be wound 1.2 or more times around the optical fiber core 2 in a cross section thereof. In other words, the circumferential length of the presser winding 3 may be 1.2 times the circumference length of the optical fiber core 2 in a cross section perpendicular to the central axis Z of the optical fiber core 2. In this case, it is possible to prevent the optical fiber core 2 or the optical fiber units 2a (2b) from inadvertently projecting out when the sheath 4 in the optical fiber cable 10 is ripped.

Examples of the presser winding 3 include, for example, a piece of water-absorbing tape. In this case, intrusion of moisture into the optical fiber core can be prevented. Additionally, a non-woven fabric, polyester tape, or the like may be used as the presser winding 3. A material for the presser winding 3 may be appropriately determined depending on the intended purpose.

Examples of the sheath 4 include, for example, a resin such as low-density polyethylene (LDPE), medium-density polyethylene (MDPE), high-density polyethylene (HDPE), and polyvinyl chloride (PVC).

Examples of the tension member 5 include, for example, a metal wire such as a high-strength glass fiber, a tensile-strength fiber such as Kevlar, and a steel wire. While the optical fiber cable 10 shown in FIGS. 1A to 1C includes two tension members 5, the number of tension members may be more than two. For example, two sets of the tension members 5 (four tension members 5 in total) may be respectively arranged at positions at which the tension members face each other with the central axis Z therebetween.

Examples of the rip cord 6 include, for example, a string made of a polyester fiber, an aramid fiber, a glass fiber, or the like. Since the rip cord 6 is in contact with the presser winding 3 as exemplarily shown in FIGS. 1D and 1E, the rip cord allows easy access to the optical fiber core 2 covered with the presser winding 3 when the sheath 4 is ripped by the rip cord 6.

Particularly, even in the optical fiber cable in which the presser winding 3 and the sheath 4 are not tightly adhered to each other, the sheath 4 can be divided into halves by ripping the sheath 4 using the two rip cords 6 which face each other with the central axis Z therebetween. Therefore, it is possible to improve the workability of removing the optical fiber 1 from the optical fiber cable 10.

The rip cord 6 may be in contact with the presser winding 3 and be embedded in the sheath 4 as shown in FIG. 1D. Alternatively, the rip cord 6 may be arranged between the sheath 4 and the presser winding 3 so as to be in contact with the sheath 4 and the presser winding 3 while having gaps g surrounded by the rip cord 6, the sheath 4, and the presser winding 3 as shown in FIG. 1E. In this case, the sheath 4 can be more easily ripped using the rip cords 6.

As shown in FIGS. 1A to 1C, the optical fiber cable 10 may include two protrusions T that are continuous in the longitudinal direction of the optical fiber cable 10 on the surface of the sheath 4. Each protrusion T may be arranged on substantially an extension of a straight line connecting the central axis Z and the rip cord 6. In this case, it is possible to prevent erroneous peeling of the sheath near the tension member 5. For example, the protrusion T is helpful in specifying the angular position of the rip cord 6 in a dark place.

The presser winding 3 and the sheath 4 may be in direct contact with each other. In this case, it is possible to reduce the outer diameter of the optical fiber cable compared with an optical fiber cable including an additional coarsely wound string between the presser winding 3 and the sheath 4. It should be noted that the coarsely wound string between presser winding 3 and the sheath 4 can be omitted using a tandem manufacturing method described below.

The optical fiber unit 2a (2b) may further include bunching members 7 bunching the optical fiber tapes 20, and the bunching members 7 may be differentiated from each other. In this case, the optical fiber units 2a (2b) can be differentiated from each other.

In the optical fiber core 2 including the optical fiber units 2a (2b), when the respective optical fiber units 2a (2b) can be differentiated from each other using the bunching members 7, the optical fiber tapes 20 can be differentiated from each other using the marks 22, and the optical fibers 1 can be differentiated from each other using colors, it will be possible to differentiate all the optical fibers 1 in the optical fiber cable 10 from each other. In this case, in an operation of removing the optical fiber 1 from the optical fiber cable 10, it is possible to specify a target optical fiber 1 among all the optical fibers 1 included in the optical fiber core 2.

Figure 4:
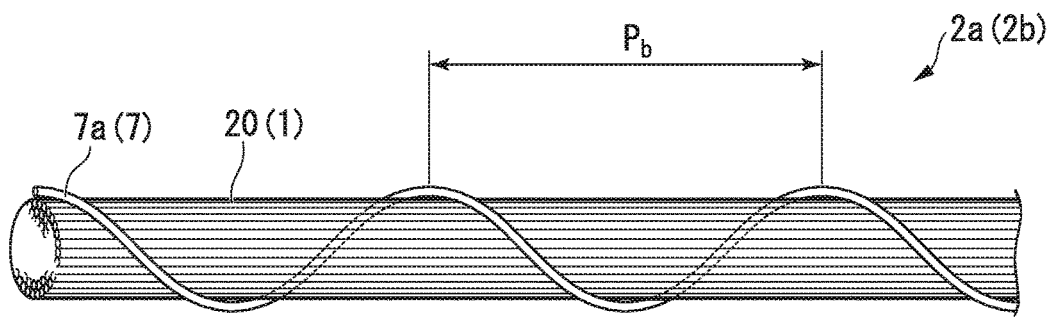
FIG. 4 is a perspective view showing an example of a plurality of the optical fiber tapes which are bunched using a bunching member.

The bunching member 7 may include a bunching string 7a arranged in a direction of the central axis Z so as to be wound around the optical fiber tapes 20. For example, as shown in FIG. 4, the bunching string 7a may be helically wound around the optical fiber tapes 20 at a pitch Pb.

Figure 5:
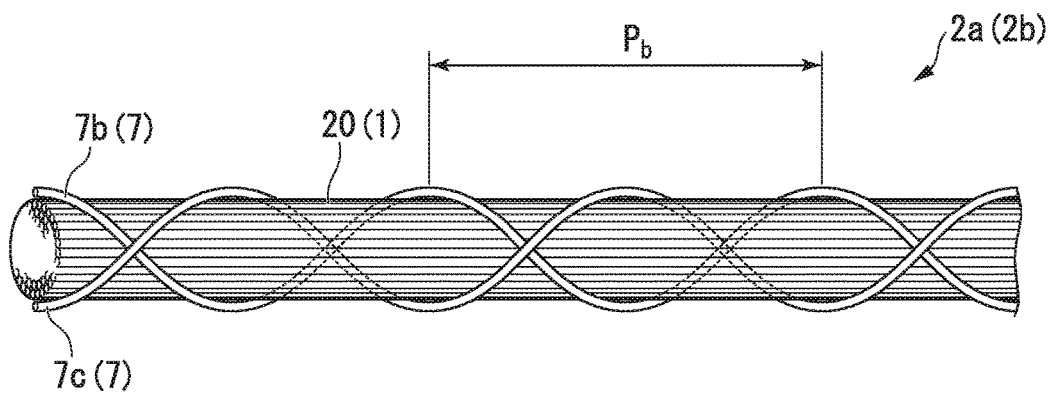
FIG. 5 is a perspective view showing another example of a plurality of the optical fiber tapes which are bunched using a bunching member.

The bunching member 7 may include a first bunching string 7b and a second bunching string 7c which are arranged in the direction of the central axis Z so as to be wound around the optical fiber tapes 20, and the winding direction of the first bunching string 7b and the winding direction of the second bunching string 7c may be opposite to each other. For example, as shown in FIG. 5, the first bunching string 7b may be helically wound around the optical fiber tapes 20 at a pitch Pb, while the second bunching string 7c may be helically wound around the optical fiber tapes 20 at a pitch Pb in a direction opposite to the winding direction of the first bunching string 7b.

Figure 6:
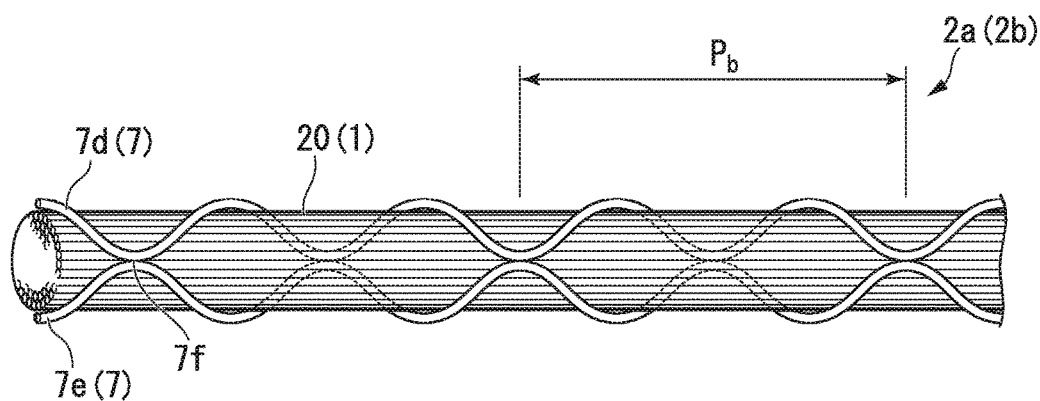
FIG. 6 is a perspective view showing still another example of a plurality of the optical fiber tapes which are bunched using a bunching member.

The bunching member 7 may include a first bunching string 7d and a second bunching string 7e which are arranged in the direction of the central axis Z so as to be wound around the optical fiber tapes 20, and the winding direction of the first bunching string 7d and the winding direction of the second bunching string 7e may be reversed at points 7f at which the first bunching string 7d and the second bunching string 7e come into contact with each other. For example, as shown in FIG. 6, the winding direction of the first bunching string 7d may be reversed at the contact points 7f every half cycle. Similarly, the winding direction of the second bunching string 7e may also be reversed at points 7f every half cycle. In FIG. 6, the distance (pitch) between the adjacent contact points 7f in the longitudinal direction of the optical fiber tape 20 is shown as Pb.

At the contact point 7f, the first bunching string 7d and the second bunching string 7e may be connected to each other by thermal fusion bonding, adhesion using an adhesive, or the like.

Disconnection between the first bunching string 7d and the second bunching string 7e at the contact point 7f by pulling the first bunching string 7d and the second bunching string 7e in opposite directions will allow easy access to the optical fiber tape 20. Thus, it is possible to improve the workability of removing the optical fiber 1 from the optical fiber cable 10.

Alternatively, the first bunching string 7d may be linearly arranged along the longitudinal direction of the optical fiber tape 20 and the second bunching string 7e may be wound around the optical fiber tape 20 such that the winding direction of the second bunching string 7e is reversed at the contact points 7f every cycle. It may be possible to apply four bunching strings to the optical fiber tape 20 in which the winding directions of the bunching strings are reversed at contact points at which two of the bunching strings come into contact with each other every quarter cycle. In these cases as well, it is possible to facilitate access to the optical fiber tape 20.

The pitch Pb for the bunching strings (7a to 7e) and the pitch Pm for the marks 22 may satisfy a relationship of 2Pb≥Pm. When disconnecting and separating the bunching strings over a length of two pitches (2Pb) or more, removal of the optical fiber tape 20 will become easy and the marks 22 will be visually confirmed easily. In other words, ripping of the bunching strings over a length of two pitches thereof will make it possible to improve the workability of removing the optical fiber tape 20 and specify a target piece of the optical fiber tape 20 among the optical fiber tapes 20 bunched together with the bunching strings. In the example of FIG. 6, the optical fiber tape 20 is exposed over a two-pitch period length of the bunching strings by breaking the joint between the first bunching string 7d and the second bunching string 7e at one contact point 7f.

Examples of the bunching member 7 (the bunching strings 7a to 7e) include, for example, a high-melting-point resin such as polypropylene (PP), polyamide (PA), and polyethylene terephthalate (PET); or a low-melting-point resin such as polyethylene (PE), an ethylene vinyl acetate (EVA) copolymer, and an ethylene ethyl acrylate (EEA) copolymer.

The optical fiber units 2a may be twisted together in an SZ manner. When the optical fiber units 2a are twisted together in an SZ manner, the optical fiber core 2 in the optical fiber cable 10 as exemplarily shown in FIG. 1B can be formed.

The respective inner units 2a may be mutually twisted in an SZ manner, and the outer units 2b may be mutually twisted in an SZ manner. For example, the inner units 2a configuring the inner core 2A are mutually twisted in an SZ manner as shown in FIG.

Figure 7A:
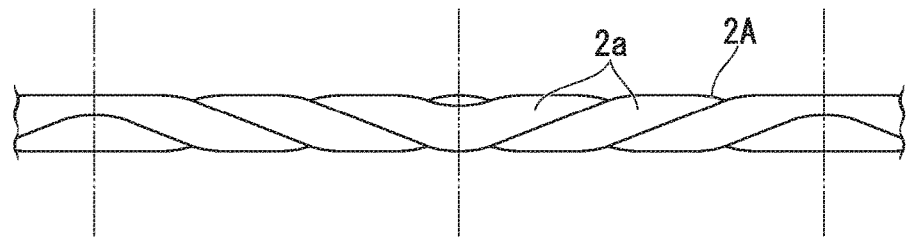
FIG. 7A is a side view showing an inner core including inner units mutually twisted in an SZ manner.
Figure 7B:
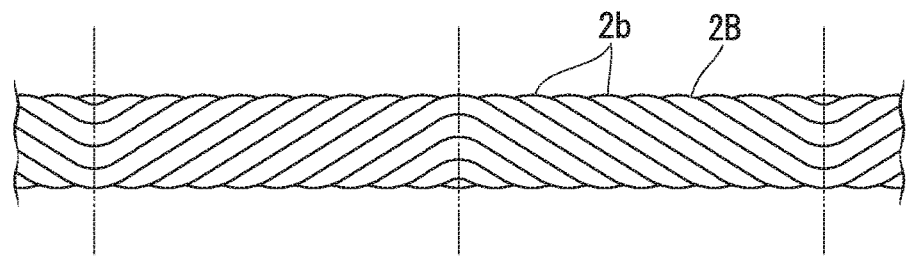
FIG. 7B is a side view showing an outer core which includes outer units twisted together in an SZ manner and covers the inner core.

7A, and further, the outer units 2b configuring the outer core 2B are mutually twisted in an SZ manner so as to cover the inner core 2A as shown in FIG. 7B. In this way, the optical fiber core 2 in the optical fiber cable 10 as shown in FIG. 1C may be formed.

It should be noted that the SZ twisting refers to twisting in two or more elements are twisted alternately with a left-hand twist (S twist) and a right-hand twist (Z twist). In other words, in the SZ twisting, the twisting directions of elements reverse at reverse points.

When twisting the inner units 2a and the outer units 2b separately, it will be possible to reduce the diameter of the entire optical fiber core and, further, to decrease the twisting angle compared with an optical fiber core in which all the optical fiber units are twisted together. As described above, whether all the optical fiber units are twisted together or the inner units 2a and the outer units 2b are separately twisted may be appropriately determined depending on the number of the optical fiber units 2a (2b). It should be noted that the twisting angle refers to an angle at which the optical fiber units 2a (2b) are twisted between two reverse points adjacent to each other.

The SZ twisting will make it possible to easily untwist the mutually twisted outer units 2b at the reverse points in the outer core 2B. Further, it will be possible to untwist the mutually twisted inner units 2a at the reverse points in the inner core 2A inside the outer core 2B. Therefore, it is possible to improve the workability of removing the optical fiber 1 from the optical fiber cable 10. Even in the optical fiber cable 10 exemplarily shown in FIG. 1B, in which all the optical fiber units are SZ-twisted, it is possible to improve the workability of removing the optical fiber 1 from the optical fiber cable 10.

<Method of Manufacturing Optical Fiber Cable>

A method of manufacturing the optical fiber cable according to an exemplary embodiment of the present invention includes: feeding the optical fiber tapes 20 including a plurality of optical fibers 1 intermittently adhered to each other; forming the optical fiber core 2 by gathering the optical fiber tapes 20; covering the outer circumference of the optical fiber core 2 with the presser winding 3; and covering the outer circumference of the presser winding 3 with the sheath 4.

The feeding of the optical fiber tapes 20, the forming of the optical fiber core 2, the covering of the outer circumference of the optical fiber core 2 with the presser winding 3, and the covering of the outer circumference of the presser winding 3 with the sheath 4 are performed in a tandem manner (tandem manufacturing). In other words, the feeding of the optical fiber tapes 20 through the covering of the presser winding 3 is performed inline.

According to the above-described manufacturing method, since the feeding of the optical fiber tapes 20, the forming of the optical fiber core 2, the covering of the outer circumference of the optical fiber core 2 with the presser winding 3, and the covering of the outer circumference of the presser winding 3 with the sheath 4 are collectively performed, it is possible to suppress the manufacturing cost of the optical fiber cable 10.

Particularly, since the covering of the optical fiber core 2 with the presser winding 3 is performed inline with the covering of the presser winding 3 with the sheath 4, it is possible to manufacture the optical fiber cable 10 without performing any coarse winding on the presser winding 3 using a coarsely wound string. Therefore, it is possible to improve the manufacturing efficiency of the optical fiber cable 10. Further, it is possible to omit a step of removing coarsely wound string when performing an operation of removing the optical fiber 1 from the optical fiber cable 10, and thus improve the workability of removing the optical fiber 1.

The forming of the optical fiber core may further include: forming a plurality of optical fiber units 2a by dividing the optical fiber tapes 20 into multiple groups and bunching each group using the bunching members 7; and mutually twisting the optical fiber units 2a in an SZ manner. In this case, particularly in the manufacturing of the optical fiber cable 10 including the optical fiber units 2a as exemplarily shown in FIG. 1B, it is possible to perform the mutual twisting of the optical fiber units 2a in an SZ manner inline with the other steps, and thus suppress the manufacturing cost of the optical fiber cable.

The forming of the optical fiber core may further include: forming a plurality of optical fiber units 2a and 2b by dividing the optical fiber tapes 20 into multiple groups and bunching each group using the bunching members 7; forming an inner core 2A by mutually twisting some of the optical fiber units 2a in an SZ manner; and forming an outer core 2B by mutually twisting the remaining units 2b in an SZ manner so as to cover the outer circumference of the inner core 2A. In this case, particularly in the manufacturing of the optical fiber cable 10 including the optical fiber units 2a and 2b as exemplarily shown in FIG. 1C, it is possible to perform the forming of the inner core 2A the forming of the outer core 2B inline with the other steps, and thus suppress the manufacturing cost of the optical fiber cable.

Figure 8:
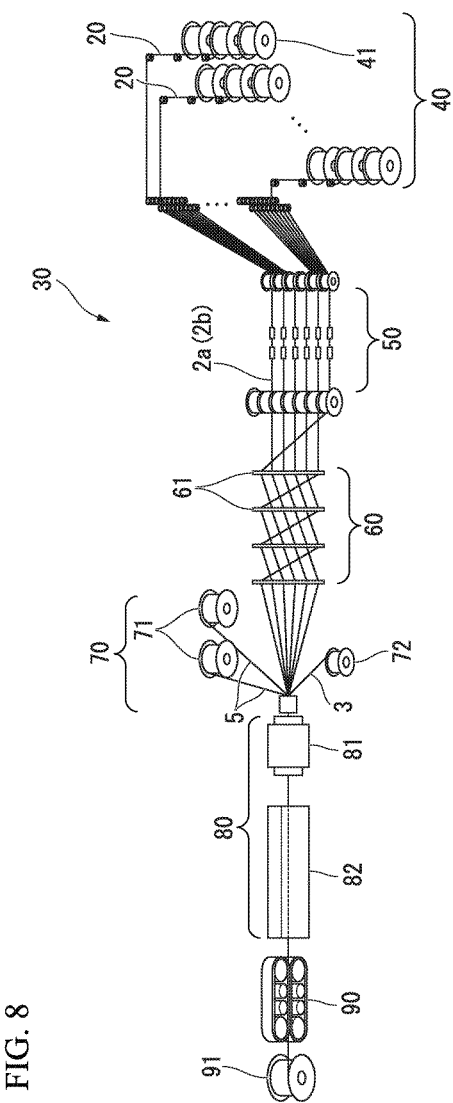
FIG. 8 is a schematic view showing an example of an apparatus for manufacturing the optical fiber cable according to an exemplary embodiment of the present invention.

FIG. 8 is a schematic view exemplarily showing an apparatus 30 for manufacturing the optical fiber cable 10. Further detail of the method of manufacturing the optical fiber cable according to the present embodiment will be described with reference to FIG. 8. In the following description, the manufacturing of the optical fiber cable 10 including the inner units 2a and the outer units 2b, as exemplarily shown in FIG. 1C, will be mainly described. In the manufacturing of the optical fiber cable 10 as exemplarily shown in FIGS. 1A and 1B, some of steps described below may be appropriately removed.

The apparatus 30 includes: a feeder 40 for feeding a plurality of optical fiber tape 20; a bunching section 50 for forming a plurality of optical fiber units 2a and 2b by bunching the pieces of the optical fiber tape 20 using the bunching members 7; a twisting section 60 for forming an inner core 2A by mutually twisting some of the optical fiber units 2a in an SZ manner and forming an outer core 2B by mutually twisting the remaining units 2b in an SZ manner so as to cover the outer circumference of the inner core 2A; a presser winding section 70 for covering the outer circumference of the outer core 2B with the presser winding 3; a sheath section 80 for covering the outer circumference of the presser winding 3 with the sheath 4; a conveyance caterpillar 90; and a winding section 91 for winding the optical fiber cable 10.

The feeding section 40 includes a plurality of reels 41 around which the optical fiber tape 20 is wound. The optical fiber tapes 20 fed from the reels 41 are divided into a desired number of optical fiber tape 20 groups, and each group of the optical fiber tapes 20 is bunched using the bunching member 7 in the bunching section 50, thereby producing a plurality of optical fiber units 2a (2b). Each group of the optical fiber tapes 20 may be bunched, for example, using the bunching member 7 as shown in FIGS. 4 to 6. It should be noted that, in the manufacturing of the optical fiber cable 10 as exemplarily shown in FIG. 1A, bunching of the optical fiber tapes using the bunching members may be omitted.

The twisting section 60 includes a plurality of round-shape line distribution boards 61. The line distribution boards 61 have multiple holes arranged in the circumferential direction thereof, and one of the optical fiber units 2a (2b) obtained in the bunching section 50 is capable of passing through the hole. A line distribution board 61 through which the inner layer unit 2a passes and another line distribution board 61 through which the outer layer unit 2b passes are separately provided, and mutual SZ twisting of the inner units 2a and the mutual SZ twisting of the outer units 2b can be performed by turning the respective line distribution boards 61. The outer circumference of the inner core 2A obtained by mutually twisting the inner units 2a in an SZ manner is covered with the outer core 2B obtained by mutually twisting the outer units 2b in an SZ manner, thereby producing the optical fiber core 2.

It should be noted that, in the manufacturing of the optical fiber cable 10 as exemplarily shown in FIG. 1A, there is no need for twisting, and thus the twisting may be omitted. In the manufacturing of the optical fiber cable 10 as exemplarily shown in FIG. 1B, since there are no outer units 2b, only the SZ twisting of the optical fiber units 2a may be performed.

The presser winding section 70 includes two reels 71 around which the tension member 5 is wound and a reel 72 around which the presser winding 3 is wound. The outer circumference of the optical fiber core 2 obtained in the twisting section 60 is covered with the presser winding 3 fed from the reel 72. Two tension members 5 fed from the reels 71 are arranged on or above the outer circumference of the presser winding 3 along the longitudinal direction.

The sheath section 80 includes an extruder 81 and a cooling device 82. The optical fiber core 2 covered with the presser winding 3 and the two tension members 5 attached thereto in the longitudinal direction are covered with a molten resin (the raw material of the sheath 4) extruded from the extruder 81. The molten resin is solidified in the cooling device 82 and thus the sheath 4 including two tension members 5 is formed on the outer circumference of the presser winding 3, thereby producing an optical fiber cable 10. The optical fiber cable 10 passes through the conveyance caterpillar 90 and is wound in the winding section 91.

The conveyance caterpillar 90 gives a tensile strength to the optical fiber cable 10 in the longitudinal direction (the flow direction of the manufacturing line) and enables the flow from the feeding of the optical fiber tape 20 in the feeding section 40 through the imparting of the sheath in the sheath section 80.

Some exemplary embodiments of the present invention have been described above, but these embodiments are simply examples of the present invention and do not limit the present invention. Any addition, removal, and substitution of components and modification of the present invention are allowed within the scope of the present invention. Therefore, the present invention is not limited by the above description and is only limited by the scope of the claims.

What is claimed is:

1. A method of manufacturing an optical fiber cable, the method comprising:
    feeding a plurality of optical fiber tapes comprising a plurality of optical fibers intermittently adhered to each other;
    forming an optical fiber core by gathering the optical fiber tapes;
    covering an outer circumference of the optical fiber core with a presser winding; and
    covering an outer circumference of the presser winding with a sheath,
    wherein the feeding of the optical fiber tapes, the forming of the optical fiber core, the covering of the outer circumference of the optical fiber core with the presser winding, and the covering of the outer circumference of the presser winding with the sheath are performed in a tandem manner, and
    wherein the forming of the optical fiber core further comprises forming a plurality of optical fiber units, each optical fiber unit comprising the optical fiber tapes.

2. The method of manufacturing an optical fiber cable according to claim 1, wherein the optical fiber units are formed by dividing the optical fiber tapes onto multiple groups and bunching each group using a bunching member.

3. The method of manufacturing an optical fiber cable according to claim 1,
    wherein the forming of the optical fiber core further comprises:
    forming a plurality of optical fiber units by dividing the optical fiber tapes into multiple groups and bunching each group using a bunching member;
    forming an inner core by mutually twisting some of the optical fiber units in an SZ manner; and
    forming an outer core by mutually twisting the remaining of the optical fiber units in an SZ manner so as to cover an outer circumference of the inner core.

4. The method of manufacturing an optical fiber cable according to claim 1, wherein the forming of the optical fiber core further comprises mutually twisting the optical fiber units in an SZ manner.

5. The method of manufacturing an optical fiber cable according to claim 1,
    wherein the covering of the outer circumference of the presser winding with the sheath are performed in an extruder, and
    wherein the forming of the optical fiber core further comprising gathering and mutually twisting the optical fiber units immediately before entering the extruder.

6. The method of manufacturing an optical fiber cable according to claim 1,
    wherein the covering of the outer circumference of the presser winding with the sheath are performed in an extruder, and
    wherein the covering of the outer circumference of the optical fiber core with the presser winding is performed immediately before the entering the extruder.

* * * * *